United States Patent [19]

Barham et al.

[11] Patent Number: 4,965,830
[45] Date of Patent: Oct. 23, 1990

[54] APPARATUS FOR ESTIMATING DISTORTION RESULTING FROM COMPRESSING DIGITAL DATA

[75] Inventors: Steven T. Barham, Salt Lake City; Michael J. Hurst, West Jordan, both of Utah

[73] Assignee: Unisys Corp., Blue Bell, Pa.

[21] Appl. No.: 297,273

[22] Filed: Jan. 17, 1989

[51] Int. Cl.$^5$ .............................................. G10L 7/02
[52] U.S. Cl. ..................................................... 381/31
[58] Field of Search ...................................... 381/29–41, 381/46–47; 364/513.5; 375/26, 34, 122

[56] References Cited

U.S. PATENT DOCUMENTS

| | | | |
|---|---|---|---|
| 4,516,258 | 5/1985 | Ching et al. | 381/31 |
| 4,535,472 | 8/1985 | Tomcik | 381/31 |
| 4,538,234 | 8/1985 | Honda et al. | 364/513.5 |
| 4,573,188 | 2/1986 | Lewinter | 375/34 |

Primary Examiner—Gary V. Harkcom
Assistant Examiner—John A. Merecki
Attorney, Agent, or Firm—John B. Sowell; Robert S. Bramson; Mark T. Starr

[57] ABSTRACT

Apparatus for analyzing distortion levels of samples which occur in data compression systems of the type that may be integrated into a data compression system or used as a stand alone analyzer. The apparatus includes a processor that is coupled to the data compression system to provide the distortion analyzing apparatus with necessary input bit allocation and power level data for each sample. Memory storage is coupled to the processor for supplying predetermined unique quantization error values corresponding to each transform coefficient representing samples of digital data in a frame of digital data to be compressed. The program in the processor calculates the estimated distortion value for each of the transform coefficients by multiplying power level values stored in the storage times the predetermined unique quantization corresponding to each transformed coefficient to provide estimated distortion values which may be summed over a frame of digital data to provide an average distortion level for a frame of digital data.

11 Claims, 3 Drawing Sheets

APPARATUS FOR ESTIMATING DISTORTION RESULTING FROM COMPRESSING DIGITAL DATA

BACKGROUND OF THE INVENTION

1. Related Applications

This application is related to and may be employed in our co-pending U.S. application Ser. No. 07/066,587 filed June 26, 1987 for "APPARATUS FOR REAL TIME DATA COMPRESSION" by R. L. Frost, K. L. Morley and D. C. Pulsipher, now U.S. Pat. No. 4,926,482.

2. Field of the Invention

The present invention relates to apparatus employed in voice, image and data compression system. More particularly, the present invention relates to a high speed method, and apparatus for analyzing distortion levels in compressed data.

3. Description of the Prior Art

Heretofore it was known that data compression systems existed that would allocate a fixed number of bits to represent a frame of digital data containing a larger number of bits. Further, it was known that transform coding techniques existed which attempted to optimize the signal to noise ratio (SNR) and minimize distortion resulting from data compression systems. A discussion of these techniques is to be found in the following articles:

(1) "Adaptive Transform Coding of Speech Signals (ATCSS)" by R. Zelinski and P. Noll; IEEE Transactions ASSP, Vol. ASSP-25, No. 4, pp. 299-309, August 1977.

(2) "Frequency Domain Coding of Speech", by J. Tribolet and R. Crochiere; IEEE Transactions ASSP, Vol. ASSP-27, No. 5, pp. 512-530, October, 1979.

(3) "Band Width Compression of Voice and Modem Signals Using Variable-Rate ATC Encoding", by D. C. Pulsipher and R. L. Frost; 1986 IEEE Military Communications Conference (MILCOM), Vol. 2 of 3, pp. 32.1.1-32.1.7.

The aforementioned application Ser. No. 07/066,587 is assigned to the assignee of the present invention and shows a real time data compression system. In such transform coding systems it was necessary to make a bit allocation to encode or compress individual frequency coefficients. This referenced system made bit allocations based on an allocation rule designed to maximize the signal to noise ratio, but did not compute or attempt to maintain a predetermined distortion level. Further, it is not known that any data compression system in the prior art employed a distortion analyzer to improve the performance of and/or reduce the cost of data compression systems.

It would be extremely desirable to provide a distortion analyzer capable of providing distortion values of individual frequency coefficients which may be utilized in numerous different ways to improve performance, improve capability and reduce cost of data compression systems.

SUMMARY OF THE INVENTION

It is the principal object of the present invention to provide a novel high speed distortion analyzer.

It is another principal object of the present invention to provide a distortion analyzer which provides an accurate estimate of the distortion level of individual frequency coefficients faster than was heretofore possible.

It is another principal object of the present invention to provide a novel distortion analyzer which enables an operator to optimize the performance of a data compression system.

It is another principal object of the present invention to provide a short and concise method of performing distortion calculations of frequency coefficients.

It is another principal object of the present invention to provide an apparatus and method for achieving any predetermined distortion level for a frame of compressed data.

It is a general object of the present invention to provide a distortion analyzer for measuring the distortion level of individual frequency coefficients to enable optimization of bit allocation in a data compression system.

It is another general object of the present invention to provide means for determining the number of total bits required to achieve a predetermined distortion level.

It is another general object of the present invention to provide operator flexibility to permit bit allocation in two distinct different ways. The operator may now find the minimum number of bits to transform any type of information given at a specified distortion level or alternatively may optimize the allocation of a predetermined given number of bits to achieve data compression.

It is another general object of the present invention to provide a distortion analyzer which will permit efficient dynamic multiplexing of a plurality of communication channels employing a fixed overall channel throughput capability.

According to these and other objects of the present invention there is provided a high speed distortion analyzer having means for storing a plurality of transformed coefficient values representative of samples of a frame of digital data. Means are provided for calculating the number of bits to be allocated for each coefficient value to allocate a predetermined total number of bits. A quantization error value and power level is determined for each coefficient value. A distortion level value may then be determined for each coefficient value by multiplying its respective power level times its unique quantization error value.

DESCRIPTION OF THE PREFERRED EMBODIMENT

Figure 1:
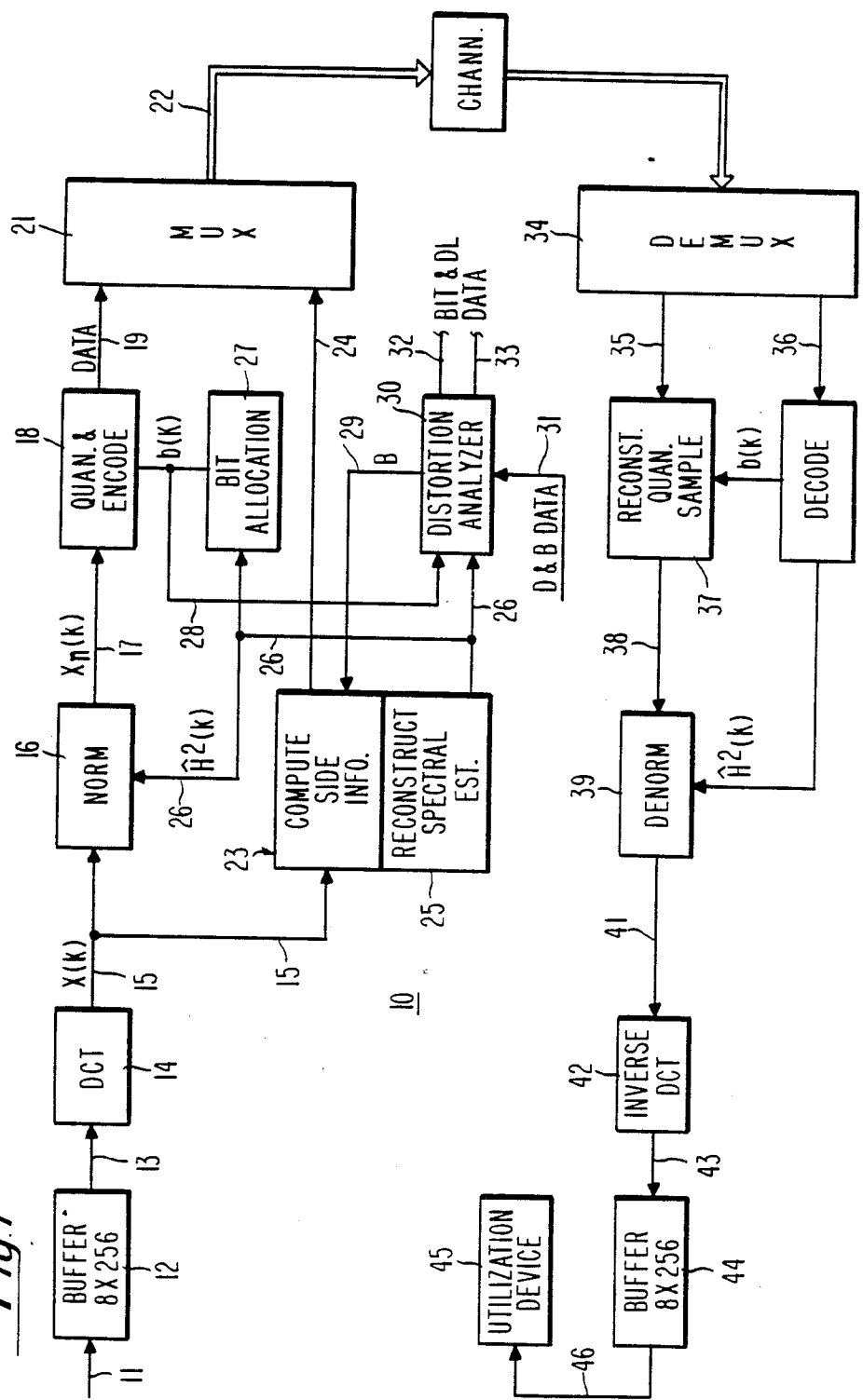
FIG. 1 is a block diagram of a data compression system of the type employing the present invention distortion analyzer.

Refer now to FIG. 1 showing a block diagram of a data compression system 10 of the type employed in the prior art in which the present invention distortion analyzer may be utilized. A stream of data on line 11 is applied to a buffer 12 which for purposes of illustration is an 8×256 storage register for collecting digital data representations of the data stream on line 11. The buffer register may be implemented in other forms but for purposes of this illustration there are 256 samples represented in digital form by 8 bits per sample. In the preferred embodiment a frame of 256 coefficients is applied on line 13 to a transformation device 14 shown in this preferred embodiment to be a discrete cosine transform device. The transform device 14 buffers and transforms the coefficients which appear as X(k) coefficients on line 15. The complete frame of coefficients on line 15 is applied to a normalizer 16 to produce normalized coefficients $X_n(K)$ on output line 17. The normalized coefficients are quantized and encoded at quantizer encoder 18 to produce encoded data on line 19 that is applied to multiplexer 21. In the preferred embodiment the output of multiplexer 21 is applied to a channel 22 for transmission to a decompressing system which may be at a remote location. Other compression systems may also present their information to channel 22 which requires a second level of multiplexing.

The coefficients appearing on line 15 are applied to a speech compression device 23 which computes the side information applied on line 24 to multiplexer 21 that is necessary to decompress the data appearing on line 19. Block 25 of the speech compression device reconstructs the spectral estimate and provides a power estimate for each of the coefficients on output line 26 which is applied to the aforementioned normalizer 16 and the bit allocation logic block 27 of the speech compression device. The bit allocation logic block 27 produces a bit allocation on its output line 28 corresponding to each normalized coefficient on line 17. A distortion analyzer 30 having an output line 29 connected to the speech compression device 23 is provided for supplying the total numbers of bits to be employed and allocated for a frame of information. The inputs to the distortion analyzer 30 include the estimated power for each of the coefficients on line 26 (also called the estimated variance) and the desired distortion and predetermined bit information data on line 31. To operate in an automatic mode, the bit allocation information on line 28 is applied as an input to the distortion analyzer 30. The information in distortion analyzer being supplied to the speech compression device 23 may be stored and analyzed further and is provided on bit and data output lines 32 and 33 for this purpose. The manner in which this information may be more efficiently used in a data compression system will be discussed in greater detail hereinafter.

The data and encoding information transmitted in channel 22 is applied to a demultiplexer 34 to provide data information on line 35 and decoding information on line 36. The data information on line 35 is reconstructed as quantitized samples at block 37 to produce a replica or approximation of the normalized coefficient information on line 38 similar to information which appeared at line 17. The normalized coefficient replica information on line 38 is denormalized at block 39 to produce an approximation on line 41 of the coefficient information which appeared at line 15. The coefficient information on line 41 is now inversely transformed at device 42 to produce raw coefficient information on line 43 that is stored in buffer 44. The buffered information in buffer register 44 is stored in utilization device 45 via line 46 as a best estimate or approximation of the information which appeared at input line 11.

Figure 2:
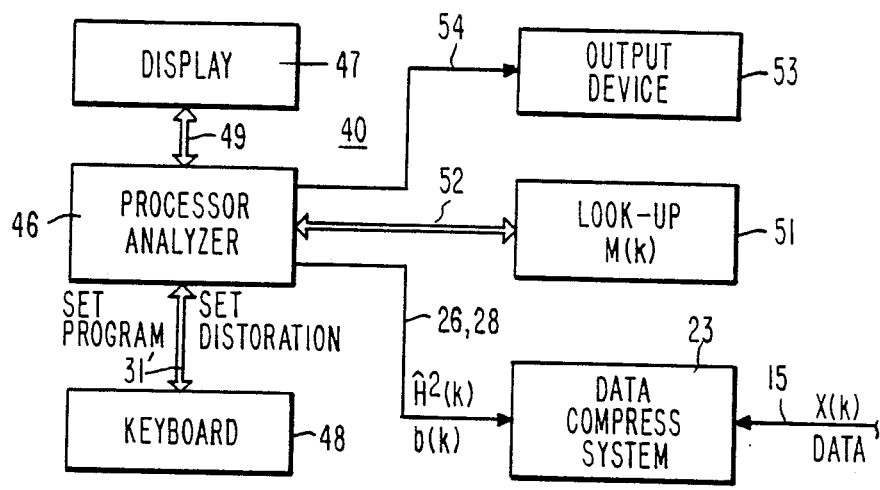
FIG. 2 is a block diagram of a preferred embodiment distortion analyzer which has been adapted for use with the data compression system shown in FIG. 1.

Refer now to FIG. 2 showing a block diagram of a preferred embodiment distortion analyzer 40 which has been adapted to operate in the environment of the compression-decompression system 10 shown in FIG. 1. Distortion analyzer 40 comprises a processor analyzer 46 having a standard monitor or display 47 and standard keyboard input 48 coupled by busses 49 and 31' respectively. Processor analyzer 46 in the preferred embodiment was implemented by employing high speed bit slice architecture with a restricted instruction set (RISC) to achieve as high a throughput speed as possible. The higher the throughput speed, the more flexible and desirable is the analyzer while maintaining reasonable cost. It will be understood that other types of fast architecture processors may be employed. In the preferred embodiment a lookup table 51 is coupled to the analyzer 46 via bus 52 to provide precalculated average quantization error data M(k) as will be explained hereinafter. Output device 53 is provided for visually analyzing physical data and preparing graphs which may be referred to in programming the analyzer. Such output devices may be in the form of printers, plotters and/or data storage devices which are coupled through bus 54 to a standard interface. In order to utilize the distortion analyzer 40 in a data compression-decompression system, lines 26, 28 which supply the bit allocation data and the average power level data are shown coupled to the aforementioned data compression system 23. Input line 15 which supplies the coefficient data is applied to the data compression system 23.

It will be understood that processor analyzer 46 of distortion analyzer 40 may be programmed with programs which achieve the following results:

1. The average distortion level $DL_O$ may be determined from a total given bit allocation for a frame of data.

2. The total number of bits to be allocated for a frame of information may be determined to achieve a desired distortion level $DL_X$.

3. Given any particular bit allocation, an average distortion level may be determined for the frame of information.

4. A printout or plot may be made on the display 47 or at the output device 53 showing the distortion level for each of the coefficients of a frame of data.

5. Distortion analyzer 40 may be coupled to a data compression system 23 so that the analyzer 40 supplies either bit information or distortion information which has been optimized. This information permits the data compression system 10 to operate in its most efficient manner.

Figure 3:
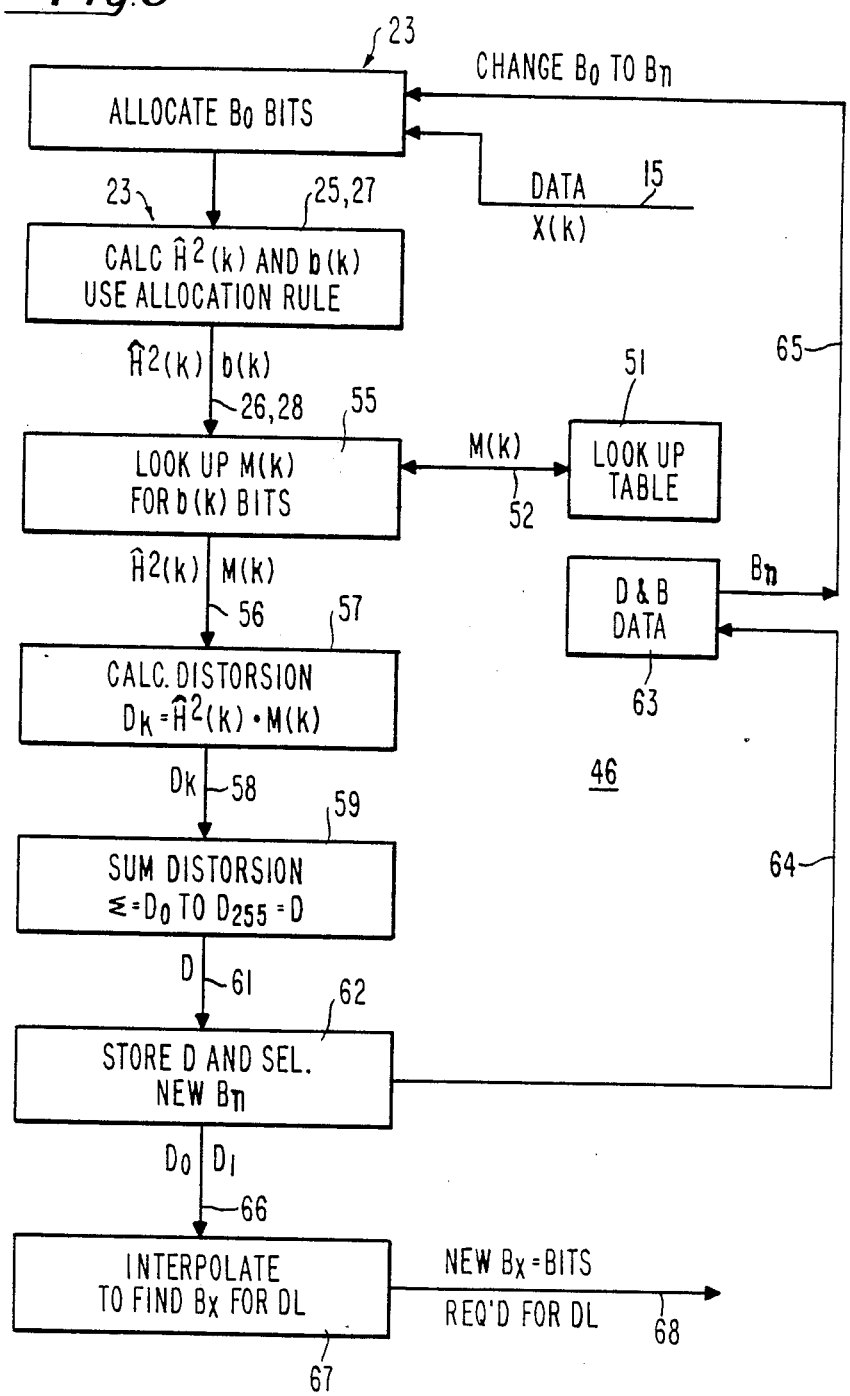
FIG. 3 is a block diagram of the steps employed to estimate the distortion level of compressed data or to determine the bits required, to achieve a predetermined distortion level.

Refer now to FIG. 3 showing a block diagram of the steps employed to estimate the distortion level of compressed data or to determine the number of bits required to achieve a predetermined distortion level. The aforementioned data compression system 23 is shown as a block which allocates a total number of bits $B_O$ used in the FIG. 1 embodiment to describe a frame of information. The total number of bits is internally manipulated in the data compression system 23 to calculate the aforementioned estimated power level $H^2(k)$ and the bit allocation value b(k) employing the allocation rule used in the data compression system. While numerous allocation rules are available, a preferred allocation rule is described in our copending U.S. Serial No. 07/066,587. The calculated information in the data compression system 23 is applied on lines 26, 28 to logic block 55 in the distortion analyzer 46 to look up an average quantization error value M(k) which is associated with a particular bit allocation value b(k). This buffered information is applied on line 56 in the processor analyzer 46 which calculates the distortion using the novel formula shown in block 57. The distortion $D_x$ is an approximation and is not an actual distortion value which may be calculated by a known lengthy and complex calculation explained in the aforementioned 1986 MILCOM reference. It is possible to make a highly accurate approximation of the distortion using the simplified formula shown in block 57 based on a knowledge of the distribution of the coefficients appearing on output line 15 in FIG. 1. In the preferred embodiment, a discrete cosine transform device was employed in block 14 to produce Gaussian random variable distributed coefficients on output line 15. It is now possible to compute or calculate the average quantization error M(k) knowing the type of distribution and the average power $H^2(k)$. This precomputed information is stored in lookup table 51. Thus, a highly accurate distortion estimate $D_k$ may be made in block 57 which is more than twice as fast as the direct method and requires 50% less hardware. It was observed that one of the desirable features of the distortion analyzer 40 is that it permits an operator of the distortion analyzer to empirically define or mathematically define average quantization error values for lookup table 51. These error values are not restricted to Gaussian or other types of mathematical distributions, but may be Uniform, LaPlace, Gamma, empirically derived, etc.

The predetermined values of M(k) stored in memory 51 were calculated from text book data for the Gaussian distribution as follows:

| Bits/Sample | 1 | 2 | 3 | 4 | 5 | 6 | 7 | 8 |
|---|---|---|---|---|---|---|---|---|
| MAX SNR(db) | 4.4 | 9.25 | 14.27 | 19.38 | 24.57 | 29.83 | 35.11 | 40.34 |
| where $M(k) = 10^{-SNR/10}$ | | | | | [dimensionless] | | | |

The individual distortion values $D_k$ on line 58 for the individual coefficients X(k) are summed in an arithmetic unit 59 of the processor analyzer 46 to provide a distortion value D for a frame of information. The distortion value on output line 61 is then preferably stored in a memory of the distortion analyzer 46 at block 62 which is programmed to select a new total bit value $B_n$ to be used to determine a second distortion level D for a frame of information. The new bit value programmed in analyzer 46 is shown as being supplied from input block 63 in response to a control signal on line 64. The new bit value on line 65 is applied to the data compression system 23 and a new calculation for distortion will appear on output line 61 and be stored in storage device 62 to enable the distortion analyzer 46 to employ the distortion values presented on line 66 at interpolation logic 67 to make numerous types of calculations. A preferred calculation made by interpolation block 67 is to find the number of required bits $B_x$ for a frame of information to achieve a predetermined distortion level DL. This information is available on output line 68 as an input to a data compression system 10 or 23. By supplying either bit information or distortion information to the data compression system an optimum throughput can be achieved for the compression-decompression system 10 shown in FIG. 1.

It will be understood that more than one compression-decompression system 10 may be provided with its own online real time distortion analyzer 30 to optimize the information being compressed and transmitted on channel 22 of FIG. 1. If each of the compression-decompression systems 10 optimizes the information to be transmitted on a single channel it is possible to employ a dynamic multiplexer 21 and optimize the use of channel 22 employing a plurality of compression-decompression systems 10.

Figure 4:
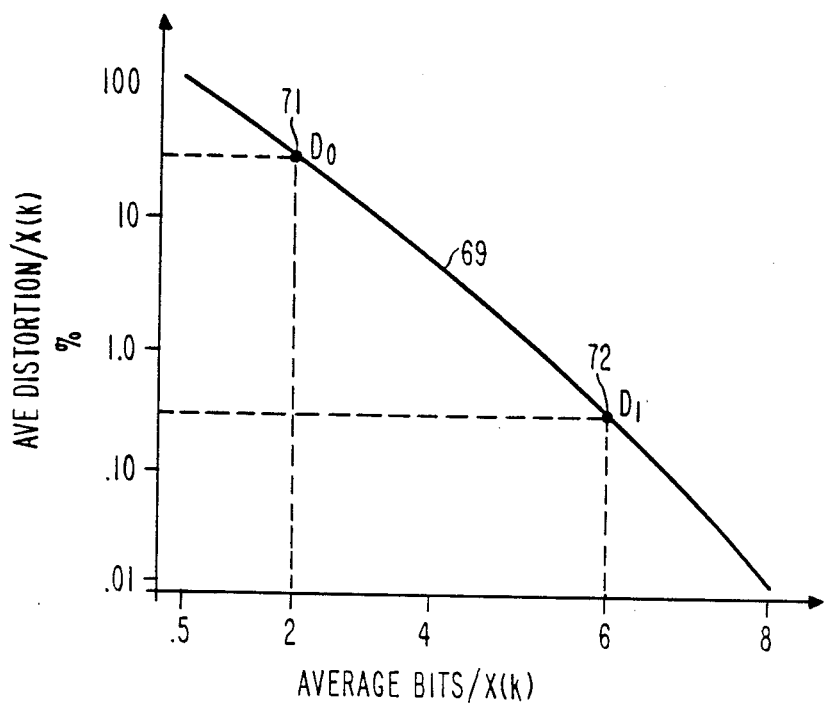
FIG. 4 is a representative graph or plot of distortion versus total bits to be allocated for compressing a frame of data.

Refer now to FIG. 4 showing a graph or plot of distortion versus the average number of bits B employed to define each coefficient X(k) of a frame of data. Curve 69 may be determined by calculating different distortion values for a plurality of total bit values to be allocated for a frame of data. The curve may then be stored in the distortion analyzer 46. If the total curve is known and stored it is possible to allocate bits for frames of information and determine the distortion level DL or alternatively to assign a distortion level and immediately determine the number of bits $B_x$ required to define the frame of information. A feature of the present invention has been described with reference to FIGS. 3 and 4 wherein a distortion value $D_o$ at point 71 and a distortion value $D_l$ at point 72 are selected in real time to enable the FIG. 1 distortion analyzer 30 to calculate the number of bits $B_x$ required for any distortion level on an interpolated curve 69. The distortion values are shown as percentages and presented on a logarithm scale so that wave form 69 is substantially linear thus enabling the rapid real time computation of either a distortion $DL_x$ level knowing the number of total allocated bits B or the number of total required bits $B_x$ knowing the distortion level DL.

Having explained the operation of a preferred embodiment distortion analyzer and the manner in which it may be employed in a data compression system, it will be understood that the present invention distortion analyzer may be used as a laboratory stand alone instrument as shown in FIG. 2 or employed in a real time system as shown in FIG. 1 to achieve optimum results of allocation of bits used for data compression or to maintain predetermined distortion levels which have been proven to be the minimum levels required for different types of compressed data. It is no longer necessary to restrict prior art data compression systems to any fixed distortion level. Variable or different distortion levels may now be applied to various types of digital information. For example, image information can tolerate higher distortion levels than forms of data which must be highly accurate. Image information can tolerate data compression ratios higher than 15:1. Normally voice information will tolerate data compression ratios slightly lower than image information. The present invention distortion analyzer may be employed in a dynamic bit allocation data compression system to select optimum distortion levels.

What is claimed is:

1. Apparatus for calculating distortion levels resulting from compressing frames of digital data in a data compression system of the type having a transform device for generating transform coefficients X(k) of digital bit samples corresponding to a frame of digital data, said apparatus comprising:
   processing means,
   coupling means for coupling said processing means to said data compression system to provide bit data B, bit allocation data b(k) and power level data $H^2(k)$ for each transformed coefficient X(k), storage means coupled to said processing means for supplying predetermined unique quantization error values M(k) for each transformed coefficient X(k), said processor means having program means for calculating estimated distortion values D(k) for each transform coefficient X(k) where D(k) is equal to said power level data $H^2(k)$ times said quantization error value M(k), and means for summing a plurality of individual estimated distortion values D(k) to provide an average distortion level value DL for a frame of digital data being compressed using B bits.

2. Apparatus as set forth in claim 1 which further includes means for storing a plurality of distortion values DL and for producing distortion curve data.

3. Apparatus as set forth in claim 2 which further includes means for producing a curve of distortion values DL versus total bits allocated B for encoding a frame of digital data.

4. Apparatus as set forth in claim 2 which further includes programming means for determining the number of total bits $B_x$ required to achieve a predetermined distortion level $DL_x$.

5. Apparatus as set forth in claim 1 which further includes means for supplying a new total bit value $B_n$ to said processing means, and program means for calculating a distortion level $DL_x$ for said new total bit value $B_n$.

6. Apparatus as set forth in claim 5 wherein said means for supplying a new total bit value $B_n$ comprises keyboard means.

7. Apparatus as set forth in claim 6 which further includes visual output means for displaying said bit values $B_n$.

8. Apparatus as set forth in claim 1 which further includes means for storing and displaying estimated distortion values D(k) for each transform coefficient X(k) and for analyzing the distortion of said data compression transform device.

9. A method of estimating the number of bits required to maintain a predetermined average distortion level $DL_x$ comprising the steps of:

transforming samples of digital data to provide transformed coefficient values X(k), calculating the number of bits B(k) to be allocated to each coefficient X(k) in order to achieve a predetermined total number of bits $B_x$, determining an average power level $H^2(k)$ and quantization values M(k) for each coefficient X(k), calculating a distortion level D(k) for each coefficient value X(k), and analyzing said distortion level D(k) information to optimize the allocation of bits $B_x$ to be allocated.

10. A method as set forth in claim 9 which further includes the steps of:

computing an average distortion level DL by summing and normalizing said individual distortion levels (D(k)).

11. A method as set forth in claim 10 which further includes steps of:

comparing said average distortion level DL with a predetermined desired distortion level $DL_x$, and selecting a new number of bits $B_x$ to achieve said desired distortion level $DL_x$.

* * * * *